US009934626B2

(12) United States Patent  
Seto et al.

(10) Patent No.: US 9,934,626 B2
(45) Date of Patent: Apr. 3, 2018

(54) BRAKE SYSTEM (71) Applicant: Hitachi Automotive Systems, Ltd., Hitachinaka-shi, Ibaraki (JP)

(72) Inventors: Shinji Seto, Hitachinaka (JP); Masaki Kanai, Hitachinaka (JP); Wataru Yokoyama, Kawasaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 20 days.

(21) Appl. No.: 14/013,655

(22) Filed: Aug. 29, 2013

(65) Prior Publication Data

US 2014/0095037 A1 Apr. 3, 2014

(30) Foreign Application Priority Data

Sep. 28, 2012 (JP) ................. 2012-215952

(51) Int. Cl.
*G07C 5/00* (2006.01)
*G07C 5/08* (2006.01)
*B60W 10/00* (2006.01)
*B60T 7/12* (2006.01)
(Continued)

(52) U.S. Cl.
CPC ............ *G07C 5/0841* (2013.01); *B60T 7/12* (2013.01); *B60W 10/00* (2013.01); *F16D 48/062* (2013.01); *F16D 48/08* (2013.01); *B60T 2201/06* (2013.01); *B60W 2510/02* (2013.01); *F16D 2500/10412* (2013.01); *F16D 2500/3026* (2013.01); *F16D 2500/3067* (2013.01); *F16D 2500/3109* (2013.01); *F16D 2500/3112* (2013.01); *F16D 2500/3115* (2013.01);
(Continued)

(58) Field of Classification Search
None
See application file for complete search history.

(56) References Cited

U.S. PATENT DOCUMENTS 5,720,534 A 2/1998 Stumpe
2006/0076204 A1* 4/2006 Kinder ........................... 192/15
(Continued)

FOREIGN PATENT DOCUMENTS

CN 101059155 A 10/2007
JP 07-040332 U 7/1995
JP H 08-048225 A 2/1996
(Continued)

*Primary Examiner* — James M McPherson
(74) *Attorney, Agent, or Firm* — Foley & Lardner LLP (57) ABSTRACT

Provided is an engagement position storage device capable of detecting a clutch engagement position of a vehicle finely and a brake system including such a device. In an engagement position storage device 2b that stores an engagement position of a clutch to engage and disengage power of a vehicle, when the vehicle becomes a traveling state in predetermined duration after acceleration in a front-back direction of the vehicle changes, the engagement position storage device 2b stores a clutch engagement position based on a clutch position detected when the acceleration changes. A brake system 1 includes a wheel latching mechanism 5 that latches wheels of a vehicle by driving a propelling member 5a by driving devices 3 and 4; and a controller 2 that controls driving of the propelling member 5a of the wheel latching mechanism 5 based on a clutch engagement position stored in the engagement position storage device 2b.

15 Claims, 5 Drawing Sheets (51) Int. Cl.
*F16D 48/08* (2006.01)
*F16D 48/06* (2006.01)

(52) U.S. Cl.
CPC ............. *F16D 2500/3127* (2013.01); *F16D 2500/7041* (2013.01); *F16D 2500/70414* (2013.01)

(56) References Cited

U.S. PATENT DOCUMENTS

2010/0063699 A1* 3/2010 O'Dea et al. .................. 701/67
2013/0173126 A1* 7/2013 Ruebsam ....................... 701/67

FOREIGN PATENT DOCUMENTS

| JP | H 09-502681 A | 3/1997 |
| JP | 2006-528581 A | 12/2006 |
| JP | 2007-126142 A | 5/2007 |
| JP | 2009-202665 A | 9/2009 |
| JP | 2011-214647 A | 10/2011 |
| JP | 2012-072914 A | 4/2012 |
| KR | 10-0310604 | 1/1995 |

* cited by examiner

BRAKE SYSTEM

BACKGROUND OF THE INVENTION

Field of the Invention

The present invention relates to an engagement position storage device that stores an engagement position of a clutch, and a brake system including the same.

Background Art

Conventionally known hydraulic disk brakes to be installed in a vehicle such as an automobile include a disk brake equipped with a parking brake mechanism.

Such a disk brake for use as a usual brake propels a piston in a cylinder by hydraulic pressure and presses a brake pad against a disk rotor, thus generating a braking force. For use as a parking brake, the disk brake rotates a rotating member of a ball-and-ramp mechanism (rotation-linear motion conversion mechanism) by an electric motor via a reducing mechanism to linearly move a linear motion member and move a piston forward, and so press a brake pad against a disk rotor, thus generating a braking force.

Such a hydraulic disk brake equipped with a parking brake mechanism has been requested to deactivate the parking brake promptly and so start a vehicle smoothly.

Japanese Laid-Open Patent Publication No. 2011-214647 (Patent Document 1) discloses a technique of releasing a parking brake promptly, including: determining the presence or not of a parking brake release request by a parking brake switch and the necessity or not of parking brake release by pressing down on an accelerator pedal; and in the case of the presence of a parking brake release request or the detection of pressing-down of an accelerator pedal of a certain amount or more, rotating a rotating member in the same direction as in the parking brake operation by an electric driving mechanism, thus directly moving a ball from a shallowest part of a beveled groove to an adjacent deepest part of the beveled groove.

This technique, however, has a problem of, for automatic release of the parking brake in response to the confirmed starting operation such as activation of an accelerator pedal by a driver, especially for rapid starting of a vehicle equipped with a manual transmission, it takes time to remove a braking force completely after starting of the releasing of the parking brake, and so it has difficulty to release the parking brake completely at a sufficient speed necessary for smooth starting of the vehicle.

To solve such a problem, Japanese Laid-Open Patent Publication No. 2006-528581 (Patent Document 2) discloses a technique of releasing a brake device equipped with an electric parking brake mechanism in response to a confirmed staring operation, in which the releasing timing thereof is specified depending on at least one measured parameter of a clutch engagement operation.

According to the technique disclosed in Patent Document 2, the operating timing of the clutch is confirmed by the engine speed or by the detection of a change in engine torque or a change in acceleration of the vehicle, whereby in the case of rapid starting of a vehicle equipped with a manual transmission as well, the releasing of the electric parking brake can be controlled finely for smooth starting of the vehicle.

The acceleration of a vehicle, however, may change due to factors other than the starting of the vehicle by a clutch engagement operation, such as vibrations induced internally or externally of the vehicle or inclination of the road surface. As such, the technique disclosed in Patent Document 2 may erroneously determine, as a clutch engagement position, the clutch position where acceleration changes due to a factor other than the starting of the vehicle by a clutch engagement operation, and so fail to detect the clutch engagement position of the vehicle finely. Automatic releasing of the braking force based on such a clutch engagement position performed at a position immediately before the clutch engagement position may erroneously release the braking force at a position away from the actual clutch engagement position, thus failing in smooth starting of the vehicle.

SUMMARY OF THE INVENTION

In view of the aforementioned problems of the conventional art, it is an object of the invention to provide an engagement position storage device capable of detecting a clutch engagement position of a vehicle finely and a brake system including such a device.

To fulfill such an object, an engagement position storage device according to the present invention stores an engagement position of a clutch to engage and disengage power of a vehicle. When the vehicle becomes a traveling state in predetermined duration after acceleration in a front-back direction of the vehicle changes, the engagement position storage device stores a clutch engagement position based on a clutch position detected when the acceleration changes.

A brake system according to the present invention includes: a wheel latching mechanism that latches wheels of a vehicle by driving a propelling member by a driving device; and a controller that controls driving of the propelling member of the wheel latching mechanism based on a clutch engagement position stored in the engagement position storage device.

EFFECTS OF THE INVENTION

According to the engagement position storage device of the present invention and the brake system including the same, when the vehicle becomes a traveling state in predetermined duration after acceleration in a front-back direction of the vehicle changes, a clutch engagement position is stored based on a clutch position detected when the acceleration changes. Thereby, a change in acceleration due to starting of the vehicle by a clutch engagement operation can be extracted, and so the clutch engagement position of the vehicle can be detected finely for storage. The thus stored clutch engagement position of the vehicle enables releasing of a braking force immediately before the actual clutch engagement position, and so enables smooth starting of the vehicle.

Problems, configurations, and advantageous effects other than those explained above will be made apparent by the following explanation of embodiments.

BRIEF DESCRIPTION OF THE DRAWINGS

FIG. 3(a) shows a time-series detected value of the clutch sensor, FIG. 3(b) shows a time-series detected value of the acceleration sensor and FIG. 3(c) shows a time-series detected value of the vehicle speed sensor.

FIG. 5(a) shows a time-series detected value of the brake hydraulic pressure sensor, FIG. 5(b) shows a time-series detected value of the acceleration sensor, and FIG. 5(c) shows a time-series detected value of the vehicle speed sensor.

FIG. 6(a) shows a time-series detected value of the brake hydraulic pressure sensor, FIG. 6(b) shows a time-series detected value of the acceleration sensor, and FIG. 6(c) shows a time-series detected value of the vehicle speed sensor.

DESCRIPTION OF AN EMBODIMENT OF THE INVENTION

The following describes embodiments of an engagement position storage device according to the present invention and a brake system including the same, with reference to the drawings.

Figure 1:
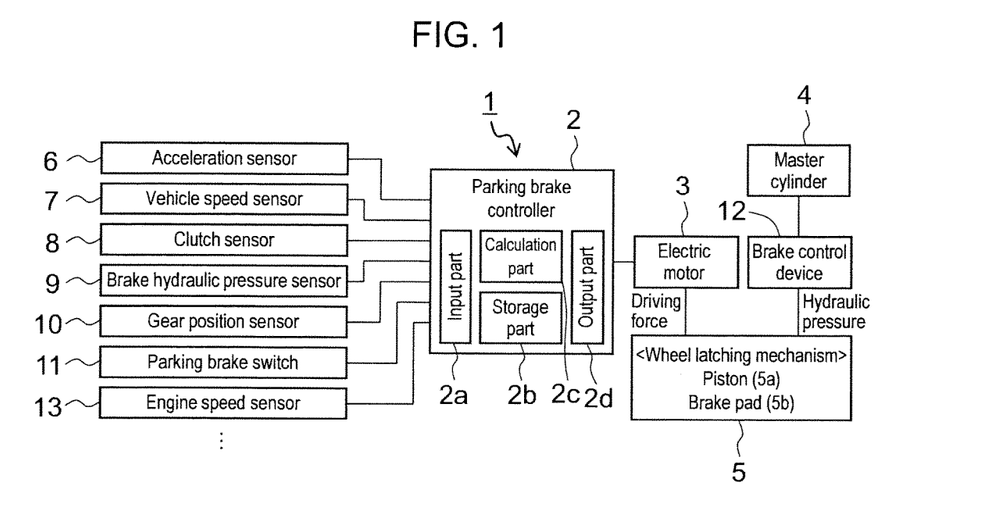
FIG. 1 shows a basic configuration of a brake system including an engagement position storage device according to the present invention.

FIG. 1 shows a basic configuration of a brake system including an engagement position storage device according to the present invention.

A brake system 1 shown in the drawing mainly includes: a master cylinder (driving device) 4, an electric motor (driving device) 3 for parking brake; a wheel latching mechanism 5 that is activated by wheel cylinder hydraulic pressure (e.g., hydraulic pressure controlled by hydraulic pressure generated by the master cylinder 4) or by the driving force of the electric motor 3; and a parking brake controller (control device) 2 that controls the driving by the electric motor 3, thus controlling the activation of the wheel latching mechanism 5. The brake system 1 may include a brake control device 12 to control hydraulic pressure by the master cylinder 4. When the brake system 1 includes the brake control device 12, the brake control device 12 may generate the wheel cylinder hydraulic pressure independently.

The wheel latching mechanism 5 includes a piston (propelling member) 5a that is driven by the wheel cylinder hydraulic pressure or the driving force (thrust) of the electric motor 3; and a brake pad 5b that is driven by the piston 5a to sandwich and push a disk rotor (not illustrated), thus generating a braking force.

The brake system 1 further includes sensors such as an acceleration sensor 6 that detects acceleration in the front-back direction of the vehicle, a vehicle speed sensor 7 that detects a speed in the front-back direction of the vehicle; and a clutch sensor 8 that detects the engagement position of a clutch or the like, and if needed, may include sensors such as a brake hydraulic pressure sensor 9 to detect the braking state of the brake, a gear position sensor 10, a parking brake switch 11 and an engine speed sensor 13.

The vehicle speed sensor 7 is attached to an axle part of the vehicle, for example, which is configured to calculate the vehicle speed by detecting a pulse signal or the like generated in accordance with the rotation of the axle and performing predetermined calculation thereto. The clutch sensor 8, for example, measures the displacement of a clutch pedal directly or measures the rotating angle of the clutch pedal.

The brake hydraulic pressure sensor 9 detects hydraulic pressure of the wheel cylinder or the master cylinder, for example. The gear position sensor 10 detects where the gear is positioned among gear positions (first, second, . . . ) for forward movement, backward movement and neutral, which may detect that the gear is positioned at backward or neutral only in one example.

The parking brake controller 2 of the brake system 1 includes: an input part 2a that receives as an input a detected value of the various types of sensors 6 to 8, 10 and 13, an operating state of the parking brake switch 11, a braking state detected by the brake hydraulic pressure sensor 9 and the like; a calculation part 2c that calculates an instruction value to control the electric motor 3; a storage part (engagement position storage device) 2b that stores various types of data; and an output part 2d that outputs a calculation result by the calculation part 2c to the electric motor 3.

The brake system 1 shown in FIG. 1 roughly operates as follows. That is, for the use as a usual brake, the piston 5a is propelled (driven) by wheel cylinder hydraulic pressure, thus generating a force to push a disk rotor (not illustrated) against the brake pad 5b. For the use as a parking brake, the piston 5a is propelled (driven) by the electric motor 3 via a reducer or a rotation-linear movement conversion mechanism (not illustrated), thus generating a force to push the disk rotor against the brake pad 5b. In this way, the disk rotor is pushed against the brake pad 5b and so the rotation of the disk rotor that rotates with the wheels of the vehicle is suppressed, whereby a braking force for the vehicle can be generated.

When the brake system 1 is equipped with an antiskid device (not illustrated) or the like, necessary hydraulic pressure may be generated by the brake control device 12 irrespective of the operation of the brake pedal (not illustrated) by the driver, and a braking force may be generated at the vehicle based on the generated hydraulic pressure.

The following describes the operation of such a brake system 1 for use as a parking brake in more detail. To apply the brake, an ON-operation state of the parking brake switch 11 by the driver, a vehicle state indicated by the various sensors and the like are detected, and then an instruction value for thrust generation is transmitted from the parking brake controller 2 to the electric motor 3. Then, based on the instruction value, the electric motor 3 is driven, so that the driving force of the electric motor 3 generates thrust at the piston 5a via the reducer or the rotation-linear movement conversion mechanism (not illustrated), thus generating a braking force at the vehicle.

To release the brake, an OFF-operation state of the parking brake switch 11 by the driver, a vehicle state indicated by the various sensors and the like are detected, and then an instruction value for thrust release is transmitted from the parking brake controller 2 to the electric motor 3. Then, based on the instruction value, the electric motor 3 drives the piston 5a in the direction opposite to the thrust generation, thus releasing the thrust applied to the brake pad 5b and so releasing the braking force at the vehicle.

Herein the braking force of the parking brake may be released by an automatic brake release function that holds the brake immediately before starting of the vehicle and automatically releases the brake immediately before the starting. Thereby the brake can be automatically released without an operation of the parking brake switch 11 by the driver, and so the convenience of the vehicle can be greatly improved.

Such an automatic brake releasing function requires precise detection of the vehicle state immediately before starting. For instance, in the case of a vehicle equipped with a manual transmission (MT vehicle), the driver who intends to start the vehicle operates the clutch pedal from the disconnection state to the connection (engagement) state. Then, the parking brake can be automatically released based on such an operation of the clutch pedal.

Specifically a release instruction value from the parking brake controller 2 to the electric motor 3 is output at any timing so that the release of the parking brake can be completed at the timing when the clutch pedal operated by the driver reaches a clutch engagement position or at timing in the vicinity thereof. More specifically, since it takes predetermined duration from starting of the release of a brake to ending of the release of the brake, the release instruction value is automatically output from the parking brake controller 2 to the electric motor 3 at timing when the position of the clutch pedal reaches (clutch engagement position)−(release duration)×(clutch pedal operation speed) or at timing in the vicinity thereof to release thrust applied to the brake pad 5b, whereby the parking brake of the vehicle is automatically released.

Herein, the clutch engagement position refers to a clutch position or a clutch pedal position where power of the vehicle starts to be transmitted to the wheel side. The release duration refers to duration from starting of the brake release to ending of the brake release. The clutch pedal operation speed refers to the speed to operate the clutch pedal from the disconnection state to the connection (engagement) state, which can be calculated from the displacement of the clutch pedal or the rotating angle of the clutch pedal, for example.

Meanwhile, it is known that the clutch engagement position changes from one vehicle to another or from one component to another or changes with the passage of time for each vehicle and component, and so for automatic release of the parking brake of a vehicle based on such a clutch engagement position, the clutch engagement position has to be detected finely and stored on a moment-to-moment basis.

Figure 2:
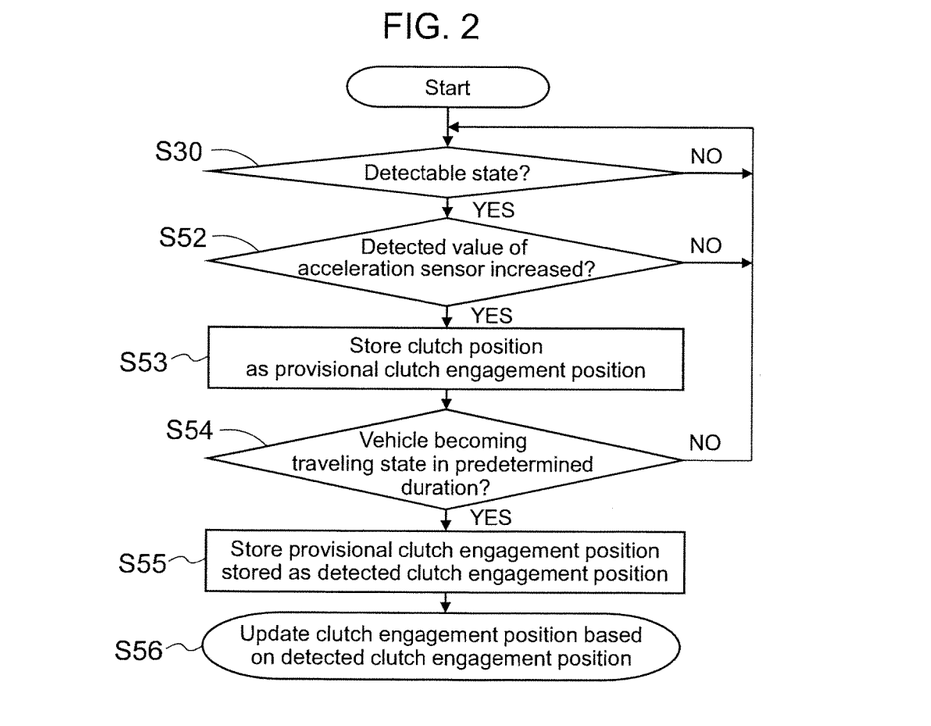
FIG. 2 is a flowchart showing the procedure to store a clutch engagement position by the engagement position storage device shown in FIG. 1.
Figure 3:
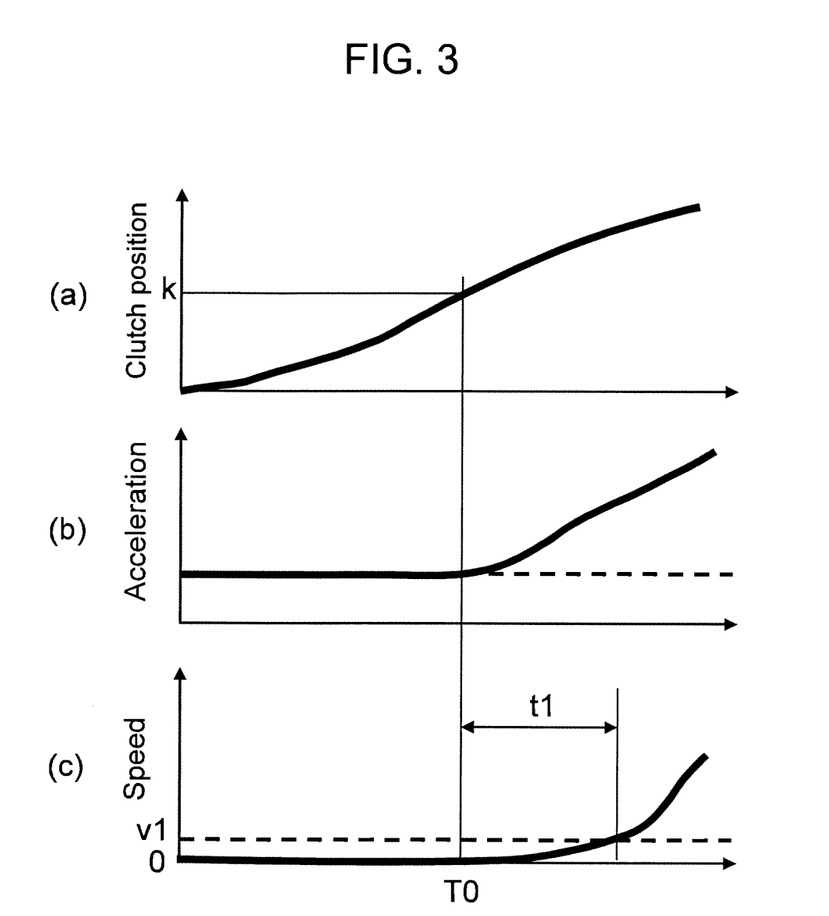
FIG. 3 shows exemplary time-series detected values of various sensors shown in FIG. 1, where

FIG. 2 is a flowchart showing the procedure to store the clutch engagement position by the engagement position storage device shown in FIG. 1, and FIG. 3 shows exemplary time-series detected values of various sensors shown in FIG. 1, where FIG. 3(a) shows a time-series detected value of the clutch sensor, FIG. 3(b) shows a time-series detected value of the acceleration sensor and FIG. 3(c) shows a time-series detected value of the vehicle speed sensor. In FIG. 3(a), the operating direction of the clutch pedal from the disconnection state to the connection (engagement) state is the positive direction of the clutch sensor. In FIG. 3(b), the direction of acceleration generated to move the vehicle forward is the positive direction of the acceleration sensor. In FIG. 3(c), the direction to move the vehicle forward is the positive direction of the vehicle speed sensor.

As shown in FIG. 2, firstly, determination is made as to whether a clutch engagement position can be detected or not based on detected values of various sensors such as the brake hydraulic pressure sensor 9 and the gear position sensor 10 (S30). The details of the determination whether the clutch engagement position can be detected will be described later.

The acceleration sensor 6 can detect small vibration, gravity or the like, and so can detect a small change in acceleration that is generated when the vehicle starts to move at the timing substantially concurrently with the starting. When it is determined as a state where the clutch engagement position can be detected, then determination is made as to whether the detected value of the acceleration sensor 6 increases or not (S52). When it is determined that the detected value increases, then the clutch position where the detected value of the acceleration sensor 6 increases is detected and such a clutch position is stored as a provisional clutch engagement position (S53).

Specifically in the case of starting a vehicle equipped with a MT by a driver, as shown in FIG. 3(a), the driver operates the clutch pedal from the disconnection state to the connection (engagement) state. Then, when the clutch reaches a clutch engagement position k by the operation of the clutch pedal, then as shown in FIG. 3(b), acceleration starts to be generated in the front-back direction of the vehicle, and thus the vehicle starts to move. Such a clutch engagement position k is stored as a provisional clutch engagement position. FIG. 3(b) shows a change of the detected value of the acceleration sensor to the positive direction, showing that the vehicle starts to move in the forward direction.

The acceleration sensor 6 detects a change in acceleration due to a factor other than the starting of the vehicle by the clutch engagement operation as well, such as a change in acceleration due to vibration of the vehicle body in the stopping state of the vehicle. Then, the speed of the vehicle is detected by the vehicle speed sensor 7, for example, whereby determination is made as to whether the vehicle becomes a traveling state or not in predetermined duration from the timing when the detected value of the acceleration sensor 6 increases (S54), and if it is determined as the vehicle becoming a traveling state, the provisional clutch engagement position stored temporarily is stored as a detected clutch engagement position (S55).

When a clutch engagement position is stored in advance, such a stored clutch engagement position is updated based on the detected clutch engagement position for storage (S56). Specifically, the detected clutch engagement position undergoes processing such as averaging processing and filtering processing described later, thus finding a clutch engagement position, and the clutch engagement position stored in advance is updated with the found clutch engagement position as a new clutch engagement position for storage. Herein, the clutch engagement position stored in advance may be updated with the detected clutch engagement position depending on the situation of the vehicle, for example, for storage.

The detected value of the vehicle speed sensor 7 increases as the vehicle starts to move, where the speed of a vehicle typically is calculated by detecting a pulse signal or the like. This means that at a low speed when the vehicle starts to move, the pulse signal cannot be detected promptly, and so the detected value of the vehicle speed sensor 7 does not increase immediately after the starting of the vehicle but starts to increase after the axle of the vehicle rotates to some extent. Therefore, for determination of the vehicle traveling state by the vehicle speed sensor 7, it is determined as the vehicle traveling state when the detected value of the vehicle speed sensor 7 increases above a predetermined value in predetermined duration after the detected value of the acceleration sensor 6 increases, and then the clutch engagement position is stored based on the provisional clutch engagement position stored temporarily.

Specifically, as shown in FIG. 3(c), determination is made as to whether the speed of the vehicle becomes faster than v1 (e.g., 1.0 km/h) or not in predetermined duration t1 from the timing T0 when the acceleration starts to be generated in the front-back direction of the vehicle, and when it is determined that the speed of the vehicle is faster than v1 and that the increase of the detected value of the acceleration sensor 6 is due to the starting of the vehicle, then the clutch engagement position k stored as the provisional clutch engagement position is stored as a detected clutch engagement position, and a clutch engagement position is stored based on such a detected clutch engagement position.

On the other hand, when it is determined that the vehicle does not become a traveling state in the predetermined duration from the timing when the detected value of the acceleration sensor 6 increases, then such an increase in the detected value of the acceleration sensor 6 is presumably due to a factor other than the starting of the vehicle by the clutch engagement operation, and so the clutch engagement position k stored as the provisional clutch engagement position is not stored as a detected clutch engagement position.

In this way, the clutch position at the timing when the detected value of the acceleration sensor 6 increases is stored temporarily as a provisional clutch engagement position, and when it is determined that the vehicle becomes a traveling state in the predetermined duration from the timing when the detected value of the acceleration sensor 6 increases, a new clutch engagement position is stored based on such a provisional clutch engagement position stored temporarily, whereby erroneous detection of the clutch engagement position resulting from an increase in acceleration due to a factor other than starting of the vehicle by the clutch engagement operation can be suppressed, and so the clutch engagement position of a vehicle can be detected finely for storage.

Note here that, for detection and storage of a clutch engagement position of a vehicle when the vehicle moves backward, a decrease in the detected value of the acceleration sensor 6 may be used as a determination criterion for the starting of the vehicle.

When the clutch connects (engages) completely after starting of the vehicle, a relationship between the speed of the engine and the speed of the vehicle is specified by a relationship of a gear ratio. Then, if a ratio between the speed of the engine detected by the engine speed sensor 13 and the speed of the vehicle or the rotating speed of the wheels agrees with the gear ratio before predetermined duration passes after the detected value of the acceleration sensor 6 increases, it may be determined as the vehicle traveling state.

As stated above, to detect a clutch engagement position of a vehicle finely for storage, the present embodiment determines as to whether it is the state where the clutch engagement position can be detected or not, and detects the clutch engagement position only when it is determined that the clutch engagement position can be detected.

Figure 4:
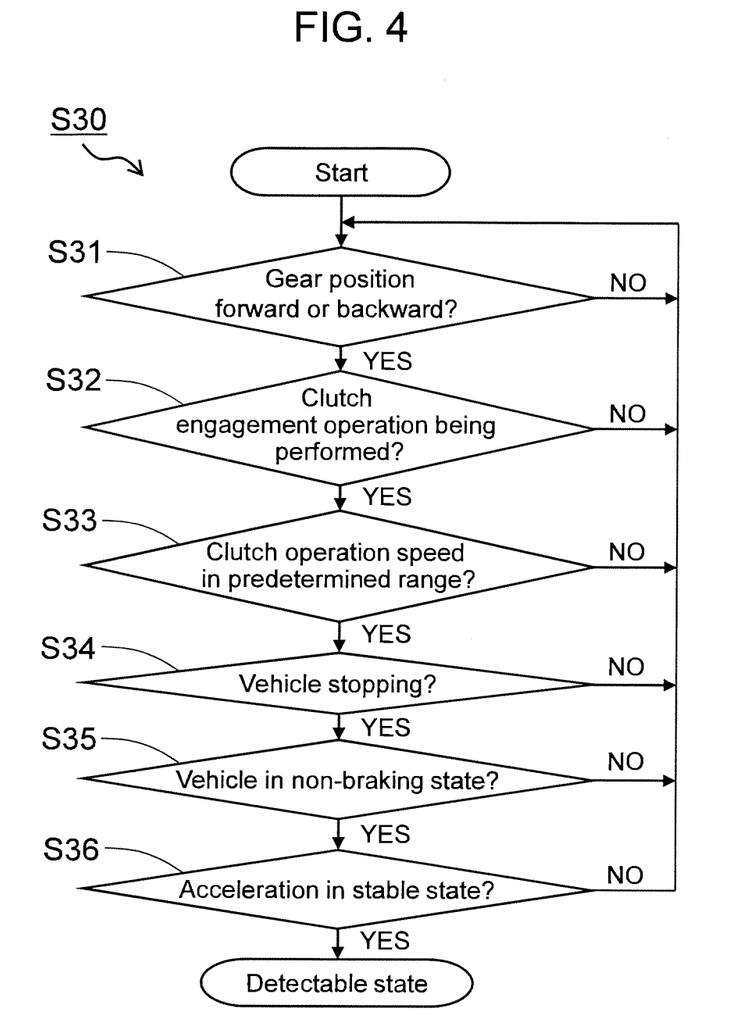
FIG. 4 is a flowchart showing the procedure to make a determination on a detectable state of the clutch engagement position shown in FIG. 2.

FIG. 4 is a flowchart showing the procedure to make a determination on a detectable state of the clutch engagement position shown in FIG. 2.

As shown in this drawing, in order to determine as to whether the clutch engagement position can be detected or not, determination is made as to whether the gear position is for forward movement or for backward movement based on a detected value of the gear position sensor 10, for example (S31), determination is made as to whether the clutch engagement operation is being performed or not based on a detected value of the clutch sensor 8, for example (S32), determination is made as to whether the operation speed of the clutch is within a predetermined range or not (S33), determination is made as to whether the vehicle stops or not based on a detected value of the vehicle speed sensor 7, for example (S34), determination is made as to whether the vehicle is in a non-braking state or not based on a detected value of the brake hydraulic pressure sensor 9, for example (S35), and determination is made as to whether the acceleration is in a stable state or not based on a detected value of the acceleration sensor 6, for example (S36). Then, only when it is determined as a detectable state of the clutch engagement position based on these determination results, the clutch engagement is detected, which is then stored as a new clutch engagement position. Note here that all of these determinations may not be always necessary, and necessary determinations only may be performed depending on the situations of the system or available various sensors.

More specifically, as shown in FIG. 4, determination is firstly made as to whether the gear position is each gear position for forward movement (first, second, . . . ) or a gear position for backward movement (gear position other than neutral) (S31), thus determining whether the driver tries to connect the clutch to start the vehicle or not. This can suppress erroneous determination of the clutch position as a clutch engagement position when the acceleration changes due to gravity or other vibrations.

Herein, determination may be made only for each gear position for forward movement (at a gear position other than neutral or backward movement), whereby a change in acceleration in the increasing direction that is the same direction of the gear position only may be detected. This can suppress erroneous detection of the clutch engagement position resulting from a change in acceleration in the direction opposite to the gear position, and so the clutch engagement position of the vehicle can be detected more finely.

Next, determination is made as to whether the clutch pedal is operated from a non-power transmission state to a power transmission state or not or as to whether the position of the clutch pedal is within a predetermined range or not, thus determining whether the clutch engagement operation is being performed or not (S32).

For instance, such determination whether the clutch pedal is operated from a non-power transmission state to a power transmission state, i.e., whether the clutch is operated from a non-power transmission state to a power transmission state, enables determination whether the vehicle is about to start or not by the operation of the clutch pedal or the clutch. This can suppress erroneous determination of the clutch position as a clutch engagement position when acceleration changes from factors other than the clutch engagement operation. Such determination whether the position of the clutch pedal is within a predetermined range or not especially whether the position of the clutch is on the power transmission side with reference to the non-power transmission side, enables determination whether the vehicle is at a stage of preparation for starting or not. This can suppress erroneous determination of the clutch position as a clutch engagement position when acceleration changes from factors other than the clutch engagement operation. Herein, since the clutch wears due to a change over time, it is preferable that the clutch position on the non-power transmission side relative to the clutch engagement position stored beforehand be determined as a detectable state for the clutch engagement position.

When the operation speed of the clutch pedal is slow, power transmission to the vehicle becomes slow, meaning that a change in acceleration during starting of the vehicle becomes small, and so the detection speed of the change in acceleration will be slow. On the other hand, it is known that, when the operation speed of the clutch pedal is fast as well, it takes time from the arrival of the clutch to the power transmission state to the vehicle starting to move, and so the power transmission to the vehicle will be delayed. When the delay of power transmission is the same time, an error of the clutch engagement position will be larger as the operation speed of the clutch pedal is faster.

Then, determination is made as to whether the operation speed of the clutch pedal is within a predetermined range or not, especially as to whether the operation speed of the clutch pedal is faster than a predetermined value or not, i.e., as to whether the operation speed of the clutch is within a predetermined range or not (S33). Thereby, the clutch engagement position is detected only when the operation speed of the clutch pedal is faster than the predetermined value and when an error of the clutch engagement position is large. When it is considered that the detection accuracy for the clutch engagement position is low, no clutch engagement position is detected, and so the clutch engagement position can be detected more finely.

Next, determination is made for the stopping state of the vehicle. For example, determination is made as to whether the absolute value of the vehicle speed sensor 7 is a predetermined value or less (S34). This can suppress erroneous determination of the clutch position as the clutch engagement position when acceleration changes from factors other than the start to move from the stopping state of the vehicle.

When the clutch connection (engagement) operation is performed while applying a braking force to the vehicle, the vehicle cannot start or the vehicle has difficulty to start due to the braking force even after the clutch reaches the clutch engagement position. Then when the clutch pedal moves further to the power transmission side (clutch connection side), the vehicle may start.

Then determination is made as to whether the vehicle is in a non-braking state, i.e., whether the vehicle is in a state of not receiving a braking force or not (S35). Specifically determination is made as to whether a thrust generation instruction value is transmitted from the parking brake controller 2 to the electric motor 3 or not (whether the wheel latching mechanism 5 is in a brake release state or not). When the brake pedal is pressed down, since the hydraulic pressure of the master cylinder 4 increases, determination is made as to whether the hydraulic pressure increases above a predetermined value or not.

When the brake system such as an antiskid device is provided, the hydraulic pressure of the master cylinder 4 does not increase but the hydraulic pressure of the wheel cylinder increases. Then, determination is made as to whether the wheel latching mechanism 5 is in a brake release state or not and the vehicle is in a non-braking state or not, and as to whether the hydraulic pressure of the wheel cylinder increases above a predetermined value or not. This can suppress deterioration of detection accuracy of the actual clutch engagement position and so the clutch engagement position can be detected more finely.

Next, comparison is made between the detected value of the acceleration sensor 6 and a value obtained by applying low-pass filter processing, for example, to the detected value of the acceleration sensor 6, and determination is made as to whether there is a difference or not in predetermine duration or whether the difference is within a predetermined range or not, or as to whether a variation of the value obtained by applying filtering processing to the detected value of the acceleration sensor 6 is within a predetermined variation threshold range in predetermined duration, thus determining whether the acceleration of the vehicle is in a stable state or not (S36).

Figure 5:
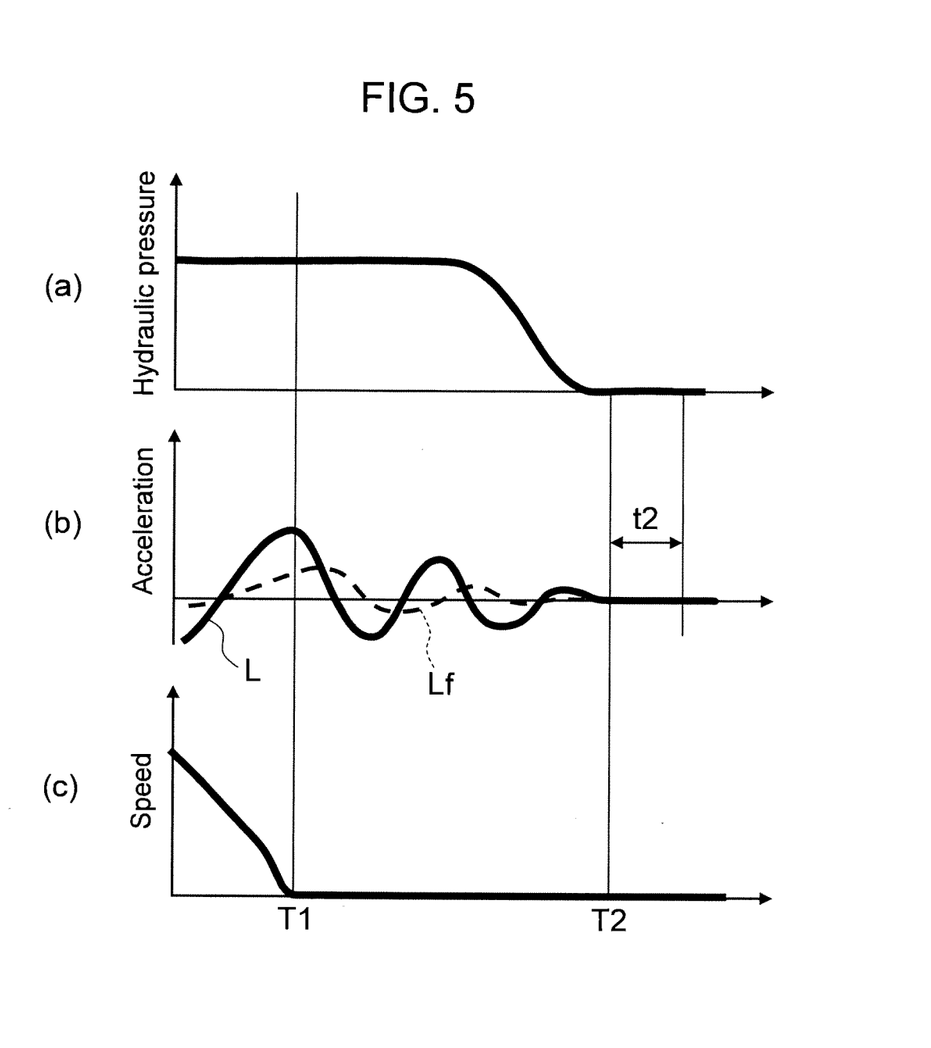
FIG. 5 shows exemplary time-series detected values of various sensors shown in FIG. 1 when the vehicle shifts from a traveling state to a stopping state, where

FIG. 5 shows exemplary time-series detected values of various sensors shown in FIG. 1 when the vehicle shifts from a traveling state to a stopping state. FIG. 5(a) shows a time-series detected value of the brake hydraulic pressure sensor, FIG. 5(b) shows a time-series detected value of the acceleration sensor, and FIG. 5(c) shows a time-series detected value of the vehicle speed sensor. In FIG. 5(b), the solid line L shows a detected value of the acceleration sensor 6 and the broken line Lf shows a value obtained by applying low-pass filter processing to the detected value of the acceleration sensor 6.

Even after the hydraulic pressure of the master cylinder 4 or the like changes to brake the vehicle as shown in FIG. 5(a) and the wheels of the vehicle themselves stop so that the vehicle speed is 0 (time T1) as shown in FIG. 5(c), the vehicle body itself still vibrates for a while, and so the acceleration changes as shown in FIG. 5(b). When a clutch engagement position is detected in such a state, since the detected value of the acceleration sensor 6 increases irrespective of the position of the clutch, such a position of the clutch may be detected erroneously as the clutch engagement position.

Then, determination is made as to whether there is no difference or not between the detected value of the acceleration sensor 6 and a value obtained by applying filtering processing to the detected value of the acceleration sensor 6, or whether the difference is within a predetermined range or not, for predetermined duration t2 after the braking of the vehicle is released and the detected value of the brake hydraulic pressure sensor 9 reaches 0 (at time T2), for example. Then after it is determined that the acceleration of the vehicle is stable, the clutch engagement position is detected. This enables more fine detection of the clutch engagement position. The detected value of the acceleration sensor 6 is compared with the value obtained by applying filtering processing thereto because the detected value of the acceleration sensor 6 may be shifted due to inclination of the road surface, balance of the vehicle in weight, the individual difference of the sensor itself and the like.

Figure 6:
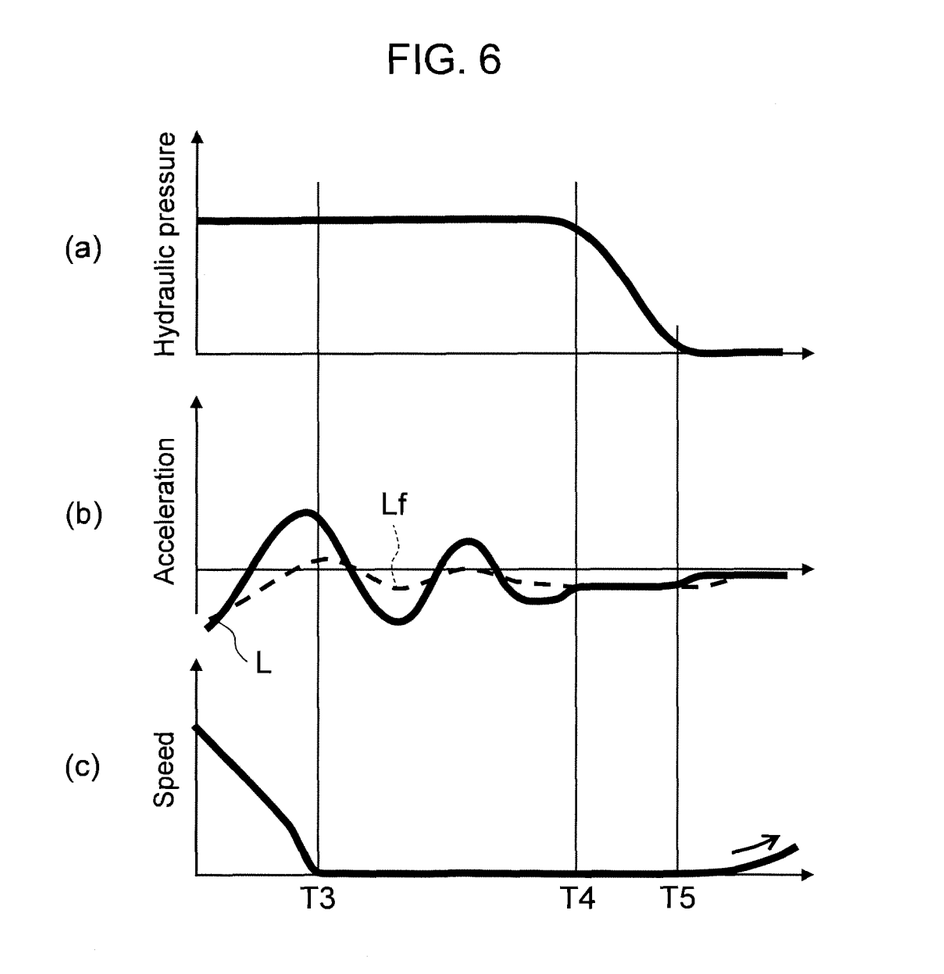
FIG. 6 shows exemplary time-series detected values of various sensors shown in FIG. 1 when the vehicle at a downslope shifts from a traveling state to a stopping state, where

FIG. 6 shows exemplary time-series detected values of various sensors shown in FIG. 1 when the vehicle at a downslope shifts from a traveling state to a stopping state. FIG. 6(a) shows a time-series detected value of the brake hydraulic pressure sensor, FIG. 6(b) shows a time-series detected value of the acceleration sensor, and FIG. 6(c) shows a time-series detected value of the vehicle speed sensor.

When a vehicle stops at a downslope (a road surface having a descending slope), after the vehicle stops (at time T3) and the acceleration becomes stable (at time T4), releasing of the braking force to the vehicle (at time T5) makes the vehicle move forward due to gravity. In such a case, as shown in FIG. 6(b), a difference is generated between the detected value L of the acceleration sensor 6 and the value Lf obtained by applying low-pass filter processing to the detected value L of the acceleration sensor 6. In that case, it is preferable not to detect the clutch engagement position because the conditions as described above referring to FIG. 5 that there is no difference between the detected value of the acceleration sensor 6 and the value obtained by applying filtering processing to the detected value of the acceleration sensor 6 or that the difference is within a predetermined range for predetermined duration t2 after the detected value of the brake hydraulic pressure sensor 9 reaches 0 (at time T2) do not hold.

Thus, when the inclination angle of the road surface where the vehicle is located can be measured or be estimated, determination is made as to whether the inclination angle is within a predetermined range or not. Then, if the inclination angle is beyond the predetermined range, especially when the road surface where the vehicle is located has a large inclination angle, the clutch engagement position may not be detected. This can suppress erroneous determination of the clutch position as the clutch engagement position when the vehicle stars to move due to the inclination angle of the road surface where the vehicle is located.

Determination may be made as to whether the variation of the value obtained by applying high-pass filter processing to the detected value L of the acceleration sensor 6 is within a predetermined variation threshold range for predetermined duration, thus determining whether the acceleration of the vehicle is in a stable state or not. That is, a vibration component only is extracted by applying the high-pass filter processing to the detected value L of the acceleration sensor 6, and if this vibration component is within the predetermined variation threshold range, it can be determined that the acceleration of the vehicle is stable.

As stated above, the clutch engagement position is detected, and a new clutch engagement position is stored based on the detected clutch engagement position, whereby a precise clutch engagement position can be stored.

Meanwhile, although the detection of a clutch engagement position in the aforementioned detectable state can improve the detection accuracy of the detected clutch engagement position, it is generally known that this detected clutch engagement position varies with the situation of the vehicle body or with how to connect the clutch, for example.

Then, when the detected clutch engagement position is stored as a new clutch engagement position in the storage part 2b of the parking brake controller 2, if the storage part 2b already stores a clutch engagement position, the newly detected clutch engagement position and the already stored clutch engagement position may be averaged, for example, and the clutch engagement position stored in the storage part 2b may be updated with the averaged clutch engagement position.

At this time, clutch engagement positions corresponding to several times that are stored in the storage part 2b may be simply averaged, or since the latest clutch engagement position presumably is closer to the actual clutch engagement position with consideration given to a change over time, weights may be assigned to a newer clutch engagement position for averaging.

As shown in the following Expression (1), filtering processing with a low-pass filter may be applied to the detected clutch engagement position that is newly detected, for example. In Expression (1), r is a constant used to assign weights.

$$\text{(Updated clutch engagement position)} = r \times \text{(detected clutch engagement position newly detected)} + (1-r) \times \text{(clutch engagement position before update)} \quad (1)$$

Such filtering processing with a low-pass filter can decrease a variation in the clutch engagement position similarly to the averaging processing, and using the clutch engagement position before update only can reduce the storage capacity of the storage part 2b.

All of the determinations shown in FIG. 4 as to whether the clutch engagement position can be detected or not cannot be always performed depending on the situation of the system and various sensors. If the clutch engagement position is detected without necessary determinations, a clutch engagement position that is greatly different from the actual clutch engagement position may be erroneously determined as the clutch engagement position.

Then, only when a difference between the newly detected clutch engagement position and the clutch engagement position before update that is already stored is within a predetermined range, especially such a difference is smaller than a predetermined value, the clutch engagement position before update that is already stored may be updated based on the newly detected clutch engagement position.

When the vehicle is located on an inclined road surface and is in a clutch engaged state, and in the state where the driving force of the engine and the gravity due to the inclination of the road surface are in balance so that the vehicle stops on the road surface, then no braking force acts on the vehicle and the speed or the acceleration thereof do not change. Specifically, this includes the situation where the vehicle is located on a road surface with rising slope, the clutch is engaged for forward movement of the vehicle, and the driving force of the engine and the gravity due to the inclination of the road surface are in balance so that the vehicle stops on the road surface or the situation where the vehicle is located on a road surface with descending slope, the clutch is engaged for backward movement of the vehicle, and the driving force of the engine and the gravity due to the inclination of the road surface are in balance so that the vehicle stops on the road surface. In such a situation, no braking force acts on the vehicle, and the speed or the acceleration thereof does not substantially change. When the clutch is further operated from this situation in the direction of the connection state (power-transmission side) to start the vehicle, the clutch engagement position may be erroneously determined as on the connection side relative to the actual clutch engagement position.

Thus only when the road surface where the vehicle is located has an inclination angle within a predetermined range, the clutch engagement position before update that is already stored may be updated based on the newly detected clutch engagement position. Herein, the inclination angle of the road surface can be estimated from the detected value of the acceleration sensor 6, for example.

When components of the clutch are changed, for example, a newly detected clutch engagement position may greatly change from the clutch engagement position before update that is already stored. Then when any one of the conditions holds, including that a difference between the newly detected clutch engagement position and the clutch engagement position before update that is already stored is within a predetermined range and that the road surface where the vehicle is located has an inclination angle within a predetermined range, the clutch engagement position before update that is already stored may be updated based on the newly detected clutch engagement position.

In this way, according to the present embodiment, the engagement position of the clutch to engage and disengage the power of the vehicle can be detected finely for storage, and for example, the brake can be released securely immediately before the starting of the vehicle for smooth starting of the vehicle.

In the aforementioned embodiment, a disk brake is used as the brake system 1. Instead, a drum brake system may be used. In the case of using a disk brake, a brake pad is pushed by the piston 5a by wheel cylinder hydraulic pressure by the master cylinder 4, the brake control device 12 and the like or a driving force of the electric motor 3, thus generating a braking force of the vehicle. On the other hand, in the case of using a drum brake, a wheel is pushed by a brake shoe inside a drum that rotates integrally with wheels by wheel cylinder hydraulic pressure, a driving force of the electric motor 3 or the like, thus generating a braking force of the vehicle.

In the aforementioned embodiment, the clutch engagement position storage device (storage part) 2b is used to release a braking force by the brake system 1. The clutch engagement position storage device 2b may be used for a system that detects a progressing state of wearing of the clutch and issues an alarm to a driver.

In the aforementioned embodiment, the brake system 1 and the clutch engagement position storage device (storage part) 2b are used for a MT vehicle. Such a brake system 1 and clutch engagement position storage device (storage part) 2b may be applied to a vehicle equipped with an auto-clutch function that automatically engages and disengages the clutch using an actuator. In such a case, since the clutch pedal is not provided, there is a need to detect the stroke of the clutch at the actuator part, but the configuration other than that is similar to the above.

The present invention is not limited to the above-described embodiments, and may include various modification examples. For instance, the entire detailed configuration of the embodiments described above for explanatory convenience is not always necessary for the present invention. A part of one embodiment may be replaced with the configuration of another embodiment, or the configuration of one embodiment may be added to the configuration of another embodiment. The configuration of each embodiment may additionally include another configuration, or a part of the configuration may be deleted or replaced.

Control lines and information lines illustrated are those considered necessary for the description, and all of the control lines and information lines necessary for the product are not always shown. It can be considered that almost all configurations are mutually connected actually.

REFERENCE SIGNS LIST 1 brake system
2 parking brake controller (controller)
2a input part
2b storage part (engagement position storage device)
2c calculation part
2d output part
3 electric motor (driving device)
4 master cylinder (driving device)
5 wheel latching mechanism
5a piston (propelling member)
5b brake pad
6 acceleration sensor
7 vehicle speed sensor
8 clutch sensor
9 brake hydraulic pressure sensor
10 gear position sensor
11 parking brake switch
12 brake control device
13 engine speed sensor

What is claimed is:

1. A brake system comprising:
a wheel latching mechanism that is configured to latch wheels of a vehicle by driving a propelling member by a driving device;
an engagement position storage device that is configured to store an engagement position of a clutch to engage and disengage power of the vehicle; and
a controller that is configured to control driving of the propelling member of the wheel latching mechanism based on a clutch engagement position stored in the engagement position storage device,
wherein the engagement position storage device is configured to:
determine, based on an output value of an acceleration sensor, whether acceleration in a front direction or a back direction of the vehicle changes;
responsive to determining based on the output value of the acceleration sensor that the acceleration in the front direction or the back direction of the vehicle changes, detect a provisional clutch engagement position when the acceleration in the front direction or the back direction of the vehicle changes, based on an output value of a clutch sensor;
responsive to determining based on the output value of the acceleration sensor that the acceleration in the front direction or the back direction of the vehicle changes, determine, based on an output value of a vehicle speed sensor, whether the vehicle is in a traveling state within a predetermined amount of time after the acceleration in the front direction or the back direction of the vehicle changes, the traveling state being a state in which a vehicle speed is above a predetermined value;
responsive to determining the vehicle being in the traveling state within the predetermined amount of time after the acceleration in the front direction or the back direction of the vehicle changes, update the clutch engagement position based on the provisional clutch engagement position; and
responsive to determining the vehicle not being in the traveling state within the predetermined amount of time after the acceleration in the front direction or the back direction of the vehicle changes, not update the clutch engagement position based on the provisional clutch engagement position,
wherein the controller is configured to control driving of the propelling member of the wheel latching mechanism based on the clutch engagement position.

2. The brake system according to claim 1,
wherein the engagement position storage device is configured to detect the provisional clutch engagement position based on the output value of the clutch sensor when the acceleration in the front direction or the back direction of the vehicle is within a predetermined range.

3. The brake system according to claim 1,
wherein the engagement position storage device is configured to detect the provisional clutch engagement position based on the output value of the clutch sensor when the vehicle is in a non-braking state, and
wherein the non-braking state comprises parking brake situations and braking situations when the vehicle is traveling.

4. The brake system according to claim 1,
wherein the engagement position storage device is configured to detect the provisional clutch engagement position based on the output value of the clutch sensor when the clutch is positioned on a non-power transmission side with reference to a clutch engagement position that is stored beforehand in the engagement position storage device.

5. The brake system according to claim 1,
wherein the engagement position storage device is configured to detect the provisional clutch engagement position based on the output value of the clutch sensor when the clutch is operated from a non-power transmission side to a power transmission side and a speed for clutch operation is within a predetermined range.

6. The brake system according to claim 1,
wherein the engagement position storage device is configured to detect the provisional clutch engagement position based on the output value of the clutch sensor when a gear position of the vehicle is for forward movement, backward movement, or both the forward movement and the backward movement.

7. The brake system according to claim 1,
wherein the engagement position storage device is configured to detect the provisional clutch engagement position based on the output value of the clutch sensor when a road surface where the vehicle is located has an inclination angle within a predetermined range.

8. The brake system according to claim 1,
wherein the engagement position storage device is configured to determine a traveling state of the vehicle based on a speed of the vehicle, a relationship between an engine speed and a rotating speed of wheels, or both the speed of the vehicle and the relationship between an engine speed and a rotating speed of wheels.

9. The brake system according to claim 1,
wherein the engagement position storage device is configured to perform averaging processing to the provisional clutch engagement position and the clutch engagement position that is stored beforehand in the engagement position storage device, and update the clutch engagement position stored beforehand in the engagement position storage device with a clutch engagement position subjected to the averaging processing.

10. The brake system according to claim 1,
wherein the engagement position storage device is configured to perform filtering processing to the provisional clutch engagement position and the clutch engagement position that is stored beforehand in the engagement position storage device, and update the clutch engagement position stored beforehand in the engagement position storage device with a clutch engagement position subjected to the filtering processing.

11. The brake system according to claim 1,
wherein when a road surface where the vehicle is located has an inclination angle within a predetermined range, the engagement position storage device is configured to update the clutch engagement position based on the provisional clutch engagement position.

12. The brake system according to claim 1,
wherein when a difference between the provisional clutch engagement position and a clutch engagement position stored beforehand in the engagement position storage device is within a predetermined range, the engagement position storage device is configured to update the clutch engagement position based on the provisional clutch engagement position.

13. The brake system according to claim 1,
wherein the controller is configured to output an instruction value to the driving device to release a latching state of the wheels by the propelling member at timing corresponding to driving time of the propelling member of the wheel latching mechanism.

14. The brake system according to claim 1, wherein the engagement position storage device is further configured to detect another provisional clutch engagement position when it is not determined that the vehicle is in the traveling state within the predetermined amount of time after the acceleration in the front direction or the back direction of the vehicle changes.

15. The brake system according to claim 1, wherein the engagement position storage device is further configured to update the clutch engagement position based on the provisional clutch engagement position only when it is determined that the vehicle is in the traveling state within the predetermined amount of time after the acceleration in the front direction or the back direction of the vehicle changes.

* * * * *